United States Patent Office 3,453,105
Patented July 1, 1969

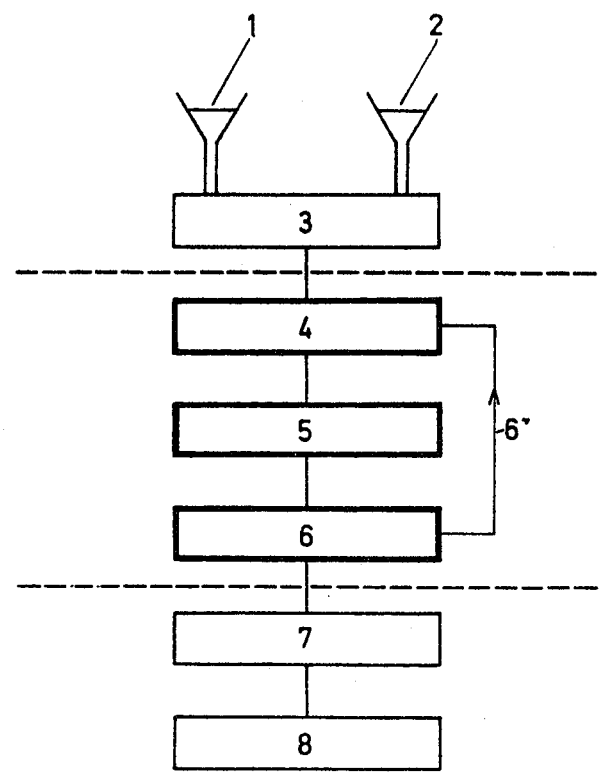

3,453,105
PROCESS FOR MANUFACTURING HIGH POROSITY SINTERED PARTS
Simon Flaks and Balint Escher, Paris, France, assignors to Societe Lignes Telegraphiques et Telephoniques, Paris, France, a joint-stock company of France
Filed Oct. 9, 1967, Ser. No. 673,857
Claims priority, application France, Nov. 24, 1966, 84,766
Int. Cl. B22f 1/00
U.S. Cl. 75—213                                 6 Claims

ABSTRACT OF THE DISCLOSURE

The process for making sintered parts of the present invention is aimed at increasing the porosity of the part by using as fine a powder as mechanical cohesion of the finished part will allow. It consists in the following steps:
(1) Mixing of metal powder and binder;
(2) Stirring the mixture while heating it;
(3) Pouring the hot mixture on a cold metal plate as a thin film to be suddenly cooled;
(4) Forcing the powder through a first calibrated sieve and keeping the portion which has passed through;
(5) Passing the powder through a second calibrated sieve and rejecting the portion which has passed through;
(6) Pelletizing the powder;
(7) Sintering the pellets.

Background of invention

The present invention is related to the manufacture of sintered parts and has a special importance in the manufacture of sintered anodes for capacitors. As is well known, some types of capacitors such as electrolytic incoporate an anode which is constituted as a spongy metallic part obtained through sintering of metal powder under such conditions as to present a high porosity. The equivalent surface of such a sponge may be much higher than its geometrical surface. Indeed the surface is not even, numerous pores reach the surface which will branch out inside the anode into a multiplicity of internal ducts. The surface of such pores is added to the geometrical surface of the pellet. The higher the number of pores, the larger the equivalent surface. The whole surface is coated with an oxide layer which is usually obtained through anodizing of the pellet. Such coating acts as the capacitor dielectric.

From the short explanation given above the importance of the surface state of the part as far as the final characteristics of the capacitor are concerned may be appreciated. In a certain range, the porosity is controlled by the sintering parameters (temperature, pressure, etc. . . .) but the range of the control is not sufficient to meet all the requirements encountered by the capacitor manufacturer.

The present evolution of the capacitor manufacturing art leads to competition for a lower cost price, an increase in the capacity per volume unit, an increase of the operating voltage at constant dissipation factor, and improvement of secondary characteristics such as temperature factor is also looked for.

According to prior practice sintered small parts such as are used as capacitor anodes are obtained through sintering of a mixture of the metal powder with a binder which will volatize out during sintering. Such binder is necessary to provide for the mechanical cohesion of the parts for pelletizing. It helps also to increase the porosity. The porosity of the completed part relies on the chemical purity of the powder and on the grain size. The first factor being considered as a constant for a given metal, the grain size can be selected by the part manufacturer. It will readily be understood that under identical manufacturing processing of a given part, the smaller the grain size, the higher the equivalent surface. However limitations occur quite rapidly as concerns the smallest grain powder which can be used in production due to the wearing out of the dies. For example, it is well known in the art that in the case of tantalum powder it is necessary to reject the part of powder from 6μm. under to obtain a reasonable life for the dies.

The process according to the present invention allows for a 10% reduction of the density of parts. As an example, the density of tantalum pellets of a given shape was in the 8.8 to 9.6 g./cm.$^3$ range according to prior practice, it has been reduced to the 7.5 to 8.8 g./cm.$^3$ range when using the present invention. The cost price of such a part is decreased accordingly. When using such a part as a capacitor anode, the overall capacity is increased by 10% without changing any further step of the capacitor manufacture at a given operating voltage. A decrease in the temperature factor and the series resistance together with a decrease in the dissipation factor are noted on the final component. In another case, the pellet made according to the present invention was further treated in order to provide for a capacitor with the same capacity as was obtained according to current practice. The sintering temperature could be chosen higher and the operating voltage of the capacitor was substantially increased.

Brief summary of invention

The invention concerns an improved process of manufacture of sintered parts. It permits a decrease in the weight of the part by about 10%. Its main application is with capacitor manufacture, the part acting as anode.

The steps of the new process are as follows:
(1) Mixing of metal powder and binder;
(2) Heating the mixture while stirring it so as to liquefy the binder;
(3) Pouring on a cold metal plate as a thin film to cool it suddenly;
(4) Forcing the powder through a first calibrated sieve and keeping the portion which has passed through;
(5) Passing the powder through a second calibrated sieve and rejecting the portion which has passed through;
(6) Pelletizing the powder;
(7) Sintering the pellets.

Detailed description

The invention will be thoroughly understood by reference to the following description and the accompanying sketch given as an illustration of the process according to the present invention to the manufacture of tantalum sintered parts to be used as solid electrolytic capacitor anodes. Of course, the invention is not to be considered as limited to the use of tantalum.

The tantalum powder as supplied from tank 1 is mixed with the binder as supplied from tank 2 in mixer 3 for about 15 minutes. The mean grain size of the powder is 10 μm. and no fine grain portion is rejected. Any grain of diameter larger than 45 μm. has been previously rejected. Binder is stearic acid in a relative concentration between 4 and 6% of the metal powder. This first step follows prior practice. The mixture is then progressively heated at 85° C. in a stove under continued stirring for 30 minutes as shown at 4 on the sketch. The heated powdery mixture is then poured on a cool plate so as to form a relatively thin layer which cools off in a few minutes. The powder is considered as cold when the binder is solid. The plate is to be chosen so as not to pollute the powder. For tantalum, stainless steel or tantalum can be used. In large volume production, it is necessary to provide cooling means associated with the plate, such as cold water circulation underneath the plate. This step is shown at 5. The powder is then forced through a sieve (Afnor mesh $n^{25}$) by any means known per se. The portion of the powder containing the grains greater than 250 μm. is thus eliminated. The powder is further passed through a sieve that will let the portion of the powder corresponding to grains smaller than 80 μm. through. This portion is rejected. Both sieving operations are shown as step 6 on the sketch. The fine grain portion rejected at the second sieving is recovered and reintroduced in the line at the heating step 4 as shown by line 6'.

The powder is further processed according to current practice. It is shaped as a pellet at stage 7 and sintered at 2000° C. during 20 minutes under vacuum at step 8. The sintered part is then ready for use. As will be understood steps 3, 7 and 8 belong to current practice, the invention lies in the introduction of steps 4, 5, 6 in the manufacturing process.

The following tables shows the characteristics of different types of tantalum capacitors incorporating an anode manufactured according to the present invention as compared to the same capacitors manufactured along exactly the same production line but incorporating anodes made according to prior practice from the same powder.

The anodes of the capacitors of Table I have been anodized in a .02% phosphoric acid solution under 225 v.

TABLE I

[Cylindrical anodes—diameter 2.84 mm., length 7.4 mm; type 3.3 μf./50 v.]

| | Pellet density, g./cm.³ | Density after sintering, g./cm.³ | Capacity, μf. | Dissipation/ weight, μf.v./g. |
|---|---|---|---|---|
| Prior practice | 9.6 | 10.1 | 2.92 | 1,900 |
| Invention practice | 8.9 | 9.3 | 3.35 | 2,025 |

The second type of anodes is obtained from the same initial tantalum powder sintered at 1850° C. for 45 minutes. They are further anodized in a .01% phosphoric acid solution under 160 v.

TABLE 2

Cylindrical anodes—diameter 6.7 mm., length 10.1 mm; type 47 μf./40 v.]

| | Pellet density, g./cm.³ | Density after sintering, g./cm.³ | Capacity, μf. | Dissipation/ weight, μf.v./g. |
|---|---|---|---|---|
| Prior practice | 8.8 | 9.7 | 43.2 | 2,380 |
| Invention practice | 7.9 | 8.8 | 48.06 | 2,650 |

A third type of capacitors is made from anodes identical with the second type except for the anodizing step performed under 100 v.

TABLE 3

[Cylindrical anodes—diameter 2.84 mm., length 7.4 mm.; type 10 μf./25 v..]

| | Pellet density, g./cm.³ | Density after sintering, g./cm.³ | Capacity, μf. | Dissipation/ weight, μf.v./g. |
|---|---|---|---|---|
| Prior practice | 9.2 | 10.1 | 9.36 | 3,700 |
| Invention practice | 7.7 | 8.8 | 10.42 | 4,000 |

We claim:

1. The process of manufacturing a sintered part comprising in combination the following steps:
   (a) mixing a metal powder and a solid binder,
   (b) heating the mixture while stirring it,
   (c) rapidly cooling the heated mixture to solidify the mixture onto a cold plate to form a relatively thin layer,
   (d) recovering the resulting cooled mixture from the cold plate,
   (e) forcing the recovered mixture through a first calibrated sieve and recovering the portion which passes through,
   (f) passing said recovered portion through a second calibrated sieve and recovering that portion which is retained upon the sieve,
   (g) pelletizing the recovered portion of the mixture, and
   (h) sintering the resulting pellets.

2. A process as claimed in claim 1 wherein the sintered part is anode for a capacitor and the recited steps comprise:
   (a) mixing tantalum powder with about 4 to 6 percent of its weight of stearic acid,
   (b) heating the mixture while stirring it to liquify the stearic acid,
   (c) rapidly cooling the heated mixture to solidify the stearic acid by pouring the heated mixture on a cold metal plate to form a relatively thin layer,
   (d) recovering the resulting mixture of Ta and stearic acid,
   (e) forcing the recovered mixture through a sieve having openings of about 250 microns maximum dimension and recovering the portion which passes through,
   (f) passing said recovered portion through a second sieve having openings of about 80 microns maximum dimension and recovering that portion which is retained upon the sieve,
   (g) pelletizing the recovered portion of the mixture, and
   (h) sintering the resulting pellets.

3. The process of manufacturing a sintered part according to claim 1 in which the metal powder is Ta and the binder is stearic acid at a concentration between 4 and 6% in weight.

4. The process of manufacturing a tantalum sintered part according to claim 1 in which the said first sieve lets through granules under a maximum dimension of 250 μm. and said second sieve lets through the granules under a maximum dimension of 80 μm.

5. The process of manufacturing a sintered part according to claim 1 in which the fine portion passing through said second sieve is reinjected in the heated stirrer.

6. The process of manufacturing an electrolytic capacitor the anode of which is manufactured according to claim 1 from 10 μm. mean grain size tantalum powder with a maximum 45 μm. size.

References Cited

UNITED STATES PATENTS

| 2,776,887 | 1/1957 | Kelly | 75—222 X |
| 3,051,566 | 8/1962 | Schwartz | 75—213 |
| 3,197,847 | 8/1965 | Kerstetter | 75—211 X |
| 3,226,263 | 12/1965 | Oswin | 75—222 X |
| 3,232,752 | 2/1966 | Klopping | 75—200 |
| 3,322,536 | 5/1967 | Stoddard | 75—211 X |

FOREIGN PATENTS

| 1,114,329 | 9/1961 | Germany. |
| 727,807 | 4/1955 | Great Britain. |
| 781,433 | 8/1957 | Great Britain. |
| 930,003 | 6/1963 | Great Britain. |

OTHER REFERENCES

Schwarzkopf "Controlled Porosity Microstructures by Powder Metallurgy," International Journal of Powder Metallurgy," vol. 2, No. 4, October 1966, pp. 3–10.

CARL D. QUARFORTH, *Primary Examiner.*

ARTHUR J. STEINER, *Assistant Examiner.*

U.S. Cl. X.R.

75—211, 212, 214, 222

UNITED STATES PATENT OFFICE
CERTIFICATE OF CORRECTION

Patent No. 3,453,105                                          July 1, 1969

Simon Flaks et al.

It is certified that error appears in the above identified patent and that said Letters Patent are hereby corrected as shown below:

Column 1, lines 38 and 39, "incoporate" should read -- incorporate --. Column 3, TABLE I, fourth column, line 2 thereof, "3.35" should read -- 3.36 --; same column 3, TABLE 2, in the heading, line 1 thereof, "Cylindrical" should read -- [Cylindrical --; same column 3, lines 67 and 68, "to solidify the mixture" should read -- by pouring the mixture --.

Signed and sealed this 21st day of April 1970.

(SEAL)
Attest:

Edward M. Fletcher, Jr.

Attesting Officer

WILLIAM E. SCHUYLER, JR.

Commissioner of Patents